United States Patent [19]
Tonies

[11] 3,745,335
[45] July 10, 1973

[54] METHOD AND APPARATUS FOR GENERATING A READ-OUT SIGNAL SYNCHRONIZED WITH RAILWAY VEHICLE MOVEMENT

[75] Inventor: Lawrence A. Tonies, Grayslake, Ill.

[73] Assignee: Mangood Corporation, Grayslake, Ill.

[22] Filed: Feb. 27, 1970

[21] Appl. No.: 15,066

[52] U.S. Cl. .................................. 246/247, 246/77
[51] Int. Cl. ............................................. B61l 1/16
[58] Field of Search ............................. 246/247, 77

[56] References Cited
UNITED STATES PATENTS

| | | | |
|---|---|---|---|
| 3,486,008 | 12/1969 | Mori | 246/247 X |
| 3,504,173 | 3/1970 | Brinker | 246/247 X |
| 3,556,236 | 1/1971 | Cory et al. | 246/247 X |
| 3,500,039 | 3/1970 | Kortyna | 246/77 |

Primary Examiner—Gerald M. Forlenza
Assistant Examiner—George H. Libman
Attorney—Davis, Lucas, Brewer & Brugman

[57] ABSTRACT

A system for generating a read-out signal which is synchronized with movement of a specific car portion such as a selected axle of each vehicle in a train past a selected location, for a mixed train of standard four-, six- and eight-axle railway cars and engines while coupled and in motion. The "selected location" has initial and final axle detectors spaced no less than 9 feet 4 inches and no more than 11 feet apart along the railroad track, for railway vehicles having axle spacings according to standard American practice. The detector spacings will differ for other axle spacings. Each detector has a counter for counting the number of axles on each vehicle and re-setting to zero after actuation by the last axle. The "selected axle" may be the last one on the vehicle where the read-out signal is used for triggering weight print-out of the vehicle. For any other information about the vehicle such as car style, type of load, shape, color, identification number, etc., the read-out signal may be generated when the counters are programmed for reset; or when the initial counter resets; or when the final counter resets; or in response to any other unique condition of the counters which occurs only once each time a vehicle moves past the axle detectors.

12 Claims, 4 Drawing Figures

Patented July 10, 1973
3,745,335
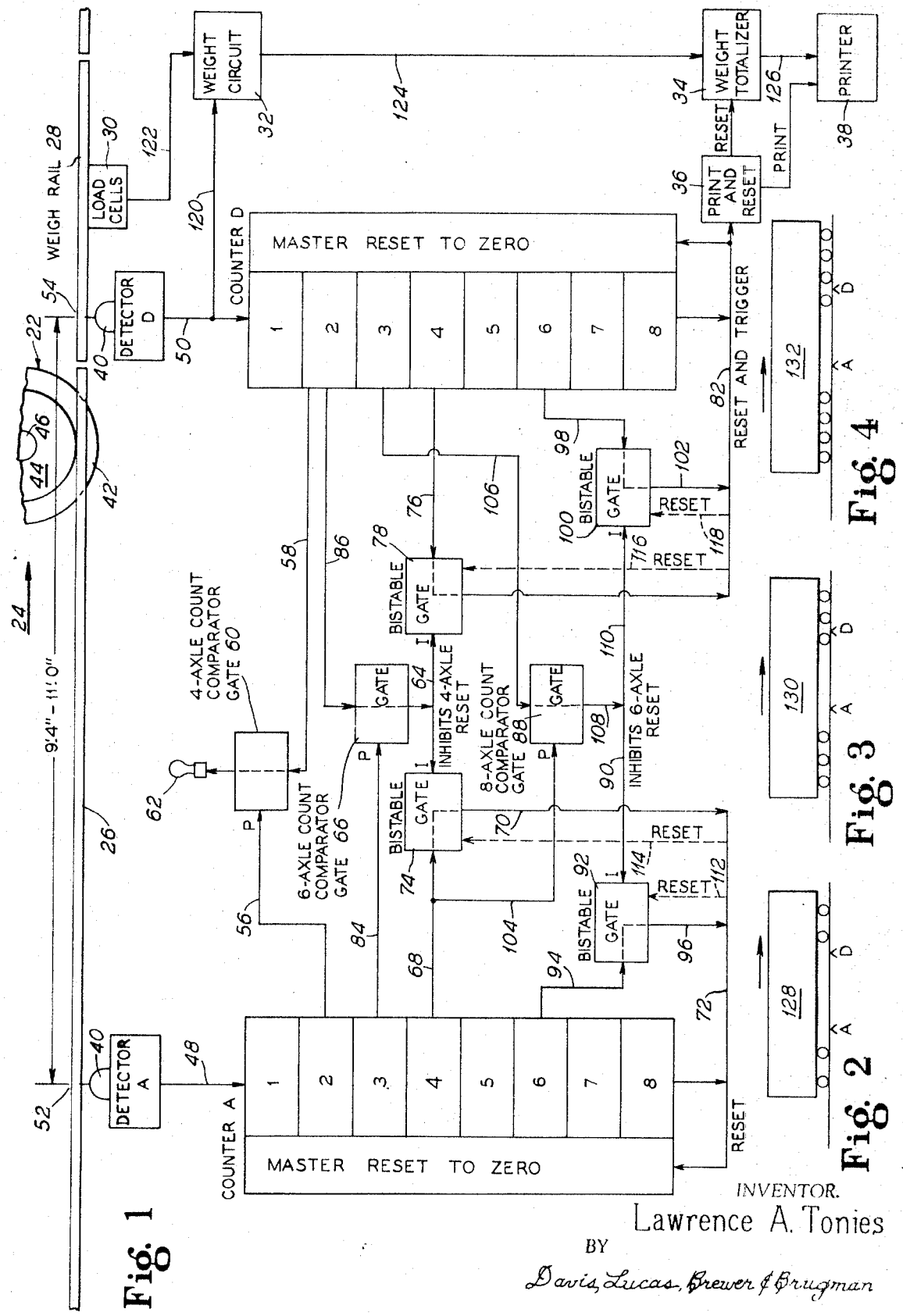
INVENTOR.
Lawrence A. Tonies
BY
Davis, Lucas, Brewer & Brugman
ATTORNEYS

3,745,335

METHOD AND APPARATUS FOR GENERATING A READ-OUT SIGNAL SYNCHRONIZED WITH RAILWAY VEHICLE MOVEMENT

CROSS REFERENCES TO RELATED APPLICATIONS

Reference is made to the following related patent applications, assigned to the same assignee, filed concurrently with this application:

Tonies and Teasdale application Ser. No. 15,067, filed Feb. 27, 1970, on "METHOD AND APPARATUS UTILIZING UNIQUE CDAB SEQUENCE FOR DETECTING SYNCHRONIZATION ERROR IN RAILWAY VEHICLE READ-OUT SIGNAL" now U.S. Pat. No. 3,646,327 issued Feb. 29, 1972;

Tonies and Teasdale application Ser. No. 15,068, filed Feb. 27, 1970, on "METHOD AND APPARATUS UTILIZING UNIQUE CDAB SEQUENCE FOR CORRECTING SYNCHRONIZATION ERROR IN RAILWAY VEHICLE READ-OUT SIGNAL" now U.S. Pat. No. 3,646,328 issued Feb. 29, 1972;

Tonies application Ser. No. 15,140, filed Feb. 27, 1970, on "METHOD AND APPARATUS FOR IDENTIFYING ENGINES IN A TRAIN OF RAILWAY VEHICLES" now U.S. Pat. No. 3,659,261 issued Apr. 25, 1972;

Tonies application Ser. No. 15,141, filed Feb. 27, 1970, on "SEQUENCE DETECTOR FOR RAILWAY VEHICLE CONTROL SYSTEM" now U.S. Pat. No. 3,605,081, issued Sept. 14, 1971;

Bailey application Ser. No. 15,142, filed Feb. 27, 1970, on "CIRCUIT FOR SIGNALING ALTERNATION ERROR IN DETECTORS FOR RAILWAY VEHICLE CONTROL SYSTEM" now U.S. Pat. No. 3,646,510 issued Feb. 29, 1972.

BACKGROUND OF THE INVENTION

The field of invention includes weighing of railroad vehicles, while coupled and in motion, Patent Office Classification No. 177-1, as well as detecting and recording other information about railroad cars and engines.

Identification of railroad cars while coupled and in motion is complicated by the fact that, although axle and coupling spacings are standardized within known limits, and with rare exceptions a car or engine will have either four, six or eight axles of standard spacings, these are generally mixed at random in a train. This complicates the problem of identifying vehicles simply by counting their axle assemblies which of course are the only elements of a railway car or engine in contact with the rails.

The weighing of railway cars while coupled and in motion, on a commercial scale, is a development of the last few years and where this is done regularly for trains of mixed four-, six- and eight-axle vehicles, individual vehicles are identified with relatively complicated apparatus requiring special installation and maintenance techniques. Roeser U.S. Pat. No. 2,543,806 and Gordon U.S. Pat. No. 3,063,635 show systems and circuits which have been developed for weighing of railway cars while coupled and in motion. Prior to the present invention, a simple, reliable system has been needed to identify each car or engine in such a mixed train.

To limit the weigh rail or bridge to a reasonable length and size, in motion weighing apparatus, the entire vehicle is usually not weighed all at once, that is, by single draft weighing. Instead, multi-draft weighing is employed, that is, by weighing individual trucks or axles on a relatively short scale. The weights of individual trucks or axles are stored in the memory bank of a weight circuit, and totalized, and the total weight of all trucks or axles for each vehicle is printed or displayed in response to a read-out signal when the last truck or axle is weighed.

It is critically important that this read-out signal occur when the last truck or axle is on the weigh rail, otherwise the weight circuit would totalize the weights of trucks or axles from adjacent cars and provide a meaningless reading.

BRIEF SUMMARY OF THE INVENTION

Broadly, the object of the present invention is to provide a method or apparatus to generate or actuate a read-out or trigger signal once per vehicle in a mixed train of standard four-, six- and eight-axle railway cars and engines to identify each as to weight, destination, origin, owner, load, or other desired information.

A principal object of the present invention is to provide a method which can be carried out manually, and apparatus which can operate automatically, for actuating a read-out signal which is synchronized, one signal per vehicle, for each car and engine in a train of standard railway vehicles, coupled and in motion in accordance with the following procedure:

a. detecting axle movements at initial and final locations spaced 9 feet 4 inches to 11 feet apart along the line of movement of the train;

b. counting the number of axles of each vehicle moving at each location beginning with "one" as the first axle reaches each location;

c. comparing the count totals of the two locations and determining the number of axles per vehicle in accordance with one or more of the following unique count sequences and combinations:

i. if the second axle has reached the initial location when the second axle has reached the final location, the vehicle has four axles, ii. if the third axle has reached the initial location when the second axle has reached the final location, the vehicle has at least six axles, and iii. if the fourth axle has reached the initial location when the third axle has reached the final location, the vehicle has eight axles;

d. counting subsequent axle movements past each location up to the total number of axles determined by one of sequences (i), (ii) or (iii) and starting over with a one-count at each location; and e. actuating a read-out signal in response to a counter condition that occurs only once as each vehicle reaches such locations.

A specific object is to provide apparatus for synchronizing a read-out signal with movement past a selected location of each vehicle in a train of standard railway cars and engines while coupled and in motion in which initial and final axle detectors are spaced about ten feet apart along the line of movement of the train. Each axle detector has a counter selectively resettable after four-, six- or eight-count totals. A count comparator compares the readings on the two counters thereby determining before a vehicle is more than halfway past the axle detectors whether it has four, six or eight axles. A reset programmer programs the counters to reset to zero (ready to count one for the first axle of the next vehicle) after each counter counts the total number of axles determined by the count comparator. And a read-out signal is actuated once per vehicle in response to a unique counter condition which occurs only once per vehicle.

Another object is to provide a system for synchronizing a read-out signal with each vehicle in a train of standard railway vehicles which is independent of the distance between the last axle of one vehicle and the first axle of the following vehicle.

Other objects and advantages will be apparent from the following description taken in connection with the drawings in which:

FIG. 1 is a schematic representation of a preferred circuit for carrying out the present invention;

FIG. 2 shows the position of a four-axle railway car relative to the axle counters at which the car is identified as one having four axles by the circuit shown in FIG. 1; and FIGS. 3 and 4 are similar to FIG. 2 with respect to a six- and eight-axle car respectively.

Like parts are identified by like reference characters throughout the figures.

Referring now in detail to the drawings, a railway vehicle axle assembly 22, carried by a car or engine some examples of which are shown in FIGS. 2 – 4 is movable along a line of train movement indicated by arrow 24. Railway tracks 26 include a small weigh rail section 28 which may be between 4 feet and 4 and ½ feet long.

As pointed out above, a read-out signal synchronized in accordance with the present invention may be used to trigger and read-out, print-out, or display of many kinds of information about a railway vehicle. In the present case it is illustrated with a multi-draft, axle-by-axle weighing system which forms no part of the present invention but which generally is as follows.

The load of one axle assembly 22 on the weight rails 28 is applied to load cells 30 which are interconnected with a weight circuit 32. The load cells are of known construction, providing an electrical network normally balanced under zero strain condition of the load cells. When the axle assembly load is applied to the weigh rail, the load cells produce an output voltage, the magnitude and phase direction of which are directly dependent upon the extent and the direction of unbalance of the network in the load sensing function of the load cells. The voltage produced by the load cells is fed into the weight circuit 32 where it will be converted to a frequency signal proportional to the voltage. The frequency is applied to an electronic counter which counts the number of cycles or pulses for a fixed time which may be 0.1 to 1.0 seconds. The weight circuit feeds a frequency count signal showing the weight of each axle assembly to the weight totalizer 34 which accumulates the weights of all the axle assemblies on a vehicle. When a read-out signal, coinciding with weighing the last axle of each vehicle, is received by the print circuit 36, a command will be placed on the weight totalizer 34 to transfer the total combined weight information of all axles of the vehicle to the printer 38. The weight totalizer 34 will reset ready to start accumulating axle weights for the following vehicle.

Circuits employing the voltage to frequency conversion of weight data are well known in the art, a few examples of which are Gordon U.S. Pat. No. 3,063,635, Cass U.S. Pat. No. 3,276,525, and Karlen U.S. Pat. No. 3,173,503 to which reference may be made for details.

Initial and final axle detectors A and D are spaced apart not less than nine feet four inches and not more than eleven feet apart along the rails 26 and 28. In one commercial arrangement, they are approximately 10 feet apart. Each detector is in the nature of a switch having an actuating plunger 40 which is positioned to be depressed by flange 42 of each wheel 44 carried by axle 46.

Counters A and D are connected by lines 48 and 50 to receive pulses from axle detectors A and D to indicate and record the movement of an axle assembly past one or the other of the locations 52 and 54 along the line of movement of the train.

Repeated actuations of either detector will cause its counter totalizers to register from one to eight, at which point it will automatically reset to zero if it has not been reset at count 4 or count 6 in the case of four- or six-axle vehicles respectively.

I have discovered that, where the axle detectors A and D are spaced no less than 9 feet 4 inches and no more than 11 feet apart, railway cars and engines using standard axle and coupling spacings may be identified by unique count sequences and totals combinations enabling use of the following formulas to determine, before more than half the axles of a car have passed the detectors, the number of axles on the vehicle (these formulas will be expressed in words to avoid mathematical representations):

Formula No. 1

When a second axle of a vehicle actuates detector D, if the second axle has also actuated detector A, the vehicle has four axles. In other words, if, when counter D reads 2, counter A reads 2, it is a four-axle vehicle.

Formula No. 2

When a second axle of a vehicle actuates detector D, if the third axle has actuated detector A, the vehicle has six or eight axles. In other words, if, when counter D reads 2, counter A reads 3, it has at least six axles.

Formula No. 3

When a third axle of a vehicle actuates detector D, if the fourth axle has actuated detector A, the vehicle has eight and not six axles. In other words, if, when counter D reads 3, counter A reads 4, it is an eight-axle vehicle.

The system shown in FIG. 1 automatically determines the number of axles for each vehicle using the principles expressed by the above formulas, and generates a read-out signal which triggers printing of the car weight coincidentally with weighing the last axle whether it be a four-, six- or eight-axle car or engine.

As will be explained, the system is programmed to reset to zero and start over again after each counter counts up to four. This assumption is based on the fact that there are many more four-axle cars than six- or eight-axle cars. If, approximately halfway through counting the axles, the system determines that there are more than four axles, it will reprogram the counters to reset at a six-count total on each of the counters on the assumption that it is a six-axle car. And if further comparison of the counter totalizers determines that the car is an eight-axle car, the counters will be reprogrammed to allow them to count a full eight counts and reset. Counters A and D count and reset independently.

As a car, alone, or coupled to other cars, moves past the detectors in the direction of the arrow 24, the axle assemblies will actuate each detector four, six or eight times for each car, depending on the number of axle assemblies on the vehicle.

When a four-axle car reaches the position shown in FIG. 2, both detectors A and D will have been actuated twice. The 2-count totalizers for both counters will be activated and will transmit signals to lines 56 and 58 leading to the 4-axle count comparator gate 60.

By way of explanation of nomenclature, "PERMIT" or "P" on a gate control line means that a signal in that line permits a signal to flow in the controlled line. "INHIBIT" or "I" on the control line means that a signal in that line inhibits or blocks a signal in the controlled line.

For example, the signal in line 56 permits the signal in line 58 to flow through the gate 60 and activate indicator light 62 to display a visual indication that the vehicle has four axles. This is not a necessary part of the control circuit and may be dispensed with if desired.

As the four-axle vehicle continues to move, it never reaches a condition where the three-count totalizer of counter A is activated concurrently with the two-count totalizer of the D counter. Therefore, the inhibit line 64 from the six-axle count comparator gate 66 will never be actuated by a four-axle car. Therefore, when the last axle of the four-axle car activates the four-count totalizer on counter A, the signal in line 68 and line 70 will activate reset line 72 through gate 74, there being no inhibit signal on line 64 to block the signal through the gate. Likewise the last axle activates the four-count totalizer of counter D and a reset signal passes through line 76, gate 78, line 80, into reset line 82. This resets counter D to zero.

A six-axle car will not activate indicator light 62 because it will not activate, concurrently, the two-count totalizer of counter A and the two-count totalizer of counter D. However, at the position shown in FIG. 3, the six-axle car will activate the three-count totalizer of counter A and the two-count totalizer of counter D, concurrently. This places a permit signal on line 84 which allows the signal from line 86 to pass through gate 66 into line 64 where it inhibits the passage of signals through both gates 74 and 78. This prevents the counters from resetting when their four-count totalizers are activated. This in effect reprograms the counters to reset when each counts six.

Continuing the example of the six-axle car, as the axles continue to pass the detectors, it will not reach a condition where the four-count totalizer of counter A and the three-count totalizer of counter D are activated at the same time. A six-axle car therefore has no effect on the gate 88 which, as will be seen, is employed for an eight-axle reset. Controlled gates 66 and 88 may be standard, off-the-shelf compenents available in various forms from a number of electronic suppliers. One such unit is the Dual J-K Flip-Flop No. MC7476P Module supplied by Motorola Semiconductor Products Inc., 4825 North Scott, Chicago, Ill. Such a module may also be used for the optional comparator gate 60.

As the six-axle car continues to count, the six-count totalizer of counter A will be activated. There will be no inhibit signal in line 90, therefore the gate 92 will be open and a reset signal will pass through line 94, gate 92, line 96, and line 72 to reset the counter A to zero.

Likewise, when the six-count totalizer of counter D is activated, a reset signal will pass through line 98, gate 100, line 102 and line 82.

Now consider the operation of the circuit with an eight-axle car.

When the three-count totalizer of counter A and the two-count totalizer of counter D are activated, placing a permit signal on gate 66 through line 84, the signal from line 86 will pass through the gate and inhibit both gates 74 and 78 to inhibit four-axle reset in the manner described above in connection with the six-axle vehicle. This, as stated, would program the counters to reset when each totals six. This, of course, is a temporary programming where the vehicle has eight axles.

Subsequently, when the four-count totalizer of counter A and the three-count totalizer of counter D are activated, a permit signal in line 104 conditions the eight-axle count comparator gate 88 to pass the signal in line 106 through the gate and line 108 into the six-axle inhibit line 110. This places an inhibit signal on both gates 92 and 100 thereby preventing the counters from resetting on their sixth counts. They independently count to eight and independently reset to zero.

It will be observed that gates 74, 78, 92 and 100 are bistable. That is, when an inhibit signal is placed on any one of these, even momentarily, it will remain in inhibiting state until reset. Resetting of these gates is carried out in response to a reset signal in lines 72 and 82 respectively via reset conductors 112, 114, 116 and 118 shown in broken lines.

Thus, as has been described, this invention is able to generate a reset signal in line 82 which is synchronized with weighing the last vehicle axle regardless of the number of axles on the vehicle so that the weight totalizer 34 will positively command the printer 38 to print a weight which represents the total weights of all the axles on each vehicle.

There are several other unique counter combinations and sequences which occur only once per vehicle and which might, if desired, be used to control a synchronized read-out or trigger signal for the print-out or display of various kinds of information. For example, one or more of the following unique conditions might be employed:

a. Activation of any one of reset lines 72, 82, 112, 114, 116 and 118;

b. Resetting of one or both of the counters A and D; and c. The appearance of any number up to a four-count on either counter.

While one form method of practicing the invention has been described, it should be understood that various modifications and variations in the invention may be attained without departing from the spirit and scope of the novel concepts thereof. For example, the circuit assumes the vehicle is a four-axle vehicle because generally there are more four-axle vehicles in a train than six- or eight-axle vehicles. If in some specialized application there were generally more six-axle vehicles than any other kind, the circuit could be initially programmed to assume that all vehicles have six axles and, if not, could be reprogrammed appropriately for four- and eight-axle vehicles.

As stated, the initial and final axle detectors A and D should be spaced between 9 feet 4 inches and 11 feet apart to function with the standard axle spacings employed in standard American railway vehicles. Other spacings may be used where railway vehicle axle spacings differ from those in current, standard American railway practice. Broadly, to function in accordance with the present invention, detectors A and D are spaced apart less than the minimum distance between inner axles on trucks at opposite ends of a standard railway vehicle (11 feet in certain ore cars, for example), and more than the maximum distance between adjacent axles on any one truck of a standard railway vehicle (9 feet in certain engines).

I claim as my invention:

1. Apparatus for actuating a read-out signal per vehicle synchronized with movement past a selected location in a mixed train of standard four, six, and eight axle railway cars and engines while coupled and in motion comprising:

initial and final axle detectors at said location spaced apart along the line of movement of the train less than the minimum distance between inner axles on trucks at opposite ends of a standard railway vehicle, and more than the maximum distance between adjacent axles on any one truck of a standard railway vehicle, each axle detector being actuatable by movement of a vehicle axle assembly past it;

Initial and final counters respectively for the initial and final axle detectors;

count comparator control means for comparing readings of said counters during the movement of each vehicle past the axle detectors, said count comparator control means being responsive before all of the axles for such vehicle have passed the axle detectors, to a unique combination of counts for each respective number of axles on a vehicle, and in dependence on the order of occurrence of a preselected one count relative to the other of the counts of the combination for identifying the total number of axles on the vehicle;

reset programming means effective in response to said count comparator control means to program the counters to reset after each counts the total number of axles on each vehicle; and read-out signals means having control means for actuating a signal in response to a unique counter condition which occurs only once per vehicle.

2. Apparatus for actuating a read-out signal per four-axle vehicle according to claim 1, in which the count comparator control means is effective to identify a four-axle vehicle in response to reading a "two" count on the initial detector counter when there is a later "two" count on the final detector counter.

3. Apparatus for actuating a read-out signal per six-axle vehicle according to claim 1, in which the count comparator control means is effective to identify a six-axle vehicle in response to reading a "three" count on the initial detector counter when there is a later "two" count on the final detector counter.

4. Apparatus for actuating a read-out signal per eight-axle vehicle according to claim 1, in which the count comparator control means is effective to identify an eight-axle vehicle in response to reading a "four" count on the initial detector counter when there is a later "three" count on the final detector counter.

5. Apparatus for actuating a read-out signal per vehicle in a train of standard railway cars and engines, according to claim 1, in which the count comparator control means is effective to identify a four-, six- or eight-axle vehicle in response to reading of the following counter comparisons:

a. a "two" count on the initial detector counter when there is a later "two" count on the final detector counter, to identify a four-axle vehicle;
   b. a "three" count on the initial detector counter when there is a later "two" count on the final detector counter, to identify a six- or eight-axle vehicle;
   c. a "four" count on the initial detector counter when there is a later "three" count on the final detector counter, to identify the vehicle as an eight-axle vehicle and not a six-axle vehicle.

6. Apparatus for actuating a read-out signal per vehicle in a train of standard railway cars and engines, according to claim 1, in which the count comparator control means is programmed to identify a vehicle as a four-axle vehicle unless it identifies the vehicle as a six- or eight-axle vehicle in response to reading one of the following counter comparisons:

a. a "three" count on the initial detector counter when there is a later "two" count on the final detector counter, to identify a six- or eight-axle vehicle;
   b. a "four" count on the initial detector counter when there is a later "three" count on the final detector counter, to identify the vehicle as an eight-axle vehicle and not a six-axle vehicle.

7. Apparatus for actuating a read-out signal according to claim 1, in which the read-out signal control means actuates a signal in response to at least one of the following unique conditions:

a. activation of said reset programming means;
   b. reset of one or both of said counters; and
   c. the appearance of any number up to a "four" count on either counter.

8. Apparatus for actuating a read-out signal according to claim 1, in which the initial and final axle detectors are spaced apart not less than 9 feet and 4 inches and not more than 11 feet.

9. Apparatus according to claim 1 wherein said standard railway cars and engines include vehicles having a minimum distance of 11 feet between inner axles on trucks at opposite ends and having a maximum distance of 9 feet 4 inches between adjacent axles on any one truck and having a minimum distance of 9 feet between a first axle and a last axle on any one truck, the spacing between said initial and final axle detectors being less than 11 feet and more than 9 feet 4 inches.

10. A method for actuating a read-out signal which is synchronized, one signal per vehicle. for each car and engine in a train of standard railway vehicles, coupled and in motion, said method comprising the following steps:

a. detecting axle movements past initial and final locations spaced 9 feet 4 inches to 11 feet apart along the line of movement of the train;
   b. counting the number of axles of each vehicle moving past each location beginning with a one-count as the first axle passes each location;
   c. comparing the count totals at the two locations and determining the number of axles per vehicle in accordance with at least one of the following unique count sequences and combinations;
      i. if only the second axle has passed the initial location at the time when the second axle has passed the final location, the vehicle has four axles, ii. if only the third axle has passed the initial location at the time when the second axle has passed the final location, the vehicle has at least six axles, and
  iii. if only the fourth axle has passed the initial location at the time when the third axle has passed the final location, the vehicle has eight axles;
d. counting subsequent axle movements past each location up to the total number of axles determined by one of sequences (i), (ii) or (iii) and starting over with a one-count for the first axle of the next vehicle at each location; and
e. actuating a read-out signal in response to a counter condition that occurs only once as each vehicle moves past said locations.

11. A method for actuating a read-out signal which is synchronized, one signal per vehicle, for each car and engine in a train of standard four, six and eight axle railway vehicles, coupled and in motion, said method comprising the steps of counting the number of axles per vehicle moving past initial and final locations spaced apart along the line of movement of the train less than the minimum distance between inner axles on trucks at opposite ends of a standard railway vehicle, and more than the maximum distance between adjacent axles on any one truck of a standard railway vehicle; comparing the count totals and sequences of arrivals of axles at said two locations as no more than half the axles of each vehicle pass each location and determining from a unique, coincident count combination and sequences of arrivals at said locations the total number of axles on the vehicle, continuing to count at said final location up to the last axle of the vehicle as the number of axles was determined by said unique count combination and relative order of occurrence of the counts of the combination, and triggering a read-out signal for each vehicle when a specific axle of that vehicle reaches a specific one of said locations.

12. The method according to claim 11 in which the initial and final locations are spaced 9 feet 4 inches to 11 feet apart.

* * * * *